United States Patent
Perez et al.

(10) Patent No.: US 9,858,482 B2
(45) Date of Patent: Jan. 2, 2018

(54) MOBILE AUGMENTED REALITY FOR MANAGING ENCLOSED AREAS

(71) Applicant: ENT. SERVICES DEVELOPMENT CORPORATION LP, Houston, TX (US)

(72) Inventors: Taciano Dreckmann Perez, Porto Alegre (BR); Diogo Strube de Lima, Sunnyvale, CA (US); Carlos Costa Haas, Porto Alegre (BR); Saulo Saraiva Schuh, Porto Alegre (BR)

(73) Assignee: Ent. Services Development Corporation LP, Houston, TX (US)

(*) Notice: Subject to any disclaimer, the term of this patent is extended or adjusted under 35 U.S.C. 154(b) by 63 days.

(21) Appl. No.: 14/759,956

(22) PCT Filed: May 28, 2013

(86) PCT No.: PCT/US2013/042881
§ 371 (c)(1),
(2) Date: Jul. 9, 2015

(87) PCT Pub. No.: WO2014/193342
PCT Pub. Date: Dec. 4, 2014

(65) Prior Publication Data
US 2015/0363647 A1  Dec. 17, 2015

(51) Int. Cl.
*G09G 5/00* (2006.01)
*G06K 9/00* (2006.01)
(Continued)

(52) U.S. Cl.
CPC .......... *G06K 9/00671* (2013.01); *G06F 3/011* (2013.01); *G06F 3/0487* (2013.01);
(Continued)

(58) Field of Classification Search
None
See application file for complete search history.

(56) References Cited

U.S. PATENT DOCUMENTS

2008/0170118 A1* 7/2008 Albertson .............. A61H 3/061
348/46
2010/0257252 A1 10/2010 Dougherty et al.
(Continued)

FOREIGN PATENT DOCUMENTS

CN   101533548     9/2009
CN   102509104 A   6/2012
(Continued)

OTHER PUBLICATIONS

Deffeyes, S.; Mobile Augmented Reality in the Data Center; IBM J. Res & Dev.; vol. 55 No. 5; Sep./Oct. 2011.
(Continued)

*Primary Examiner* — Xiao Wu
*Assistant Examiner* — Mohammad H Akhavannik
(74) *Attorney, Agent, or Firm* — Sheppard Mullin Richter & Hampton LLP

(57) ABSTRACT

Example embodiments relate to providing mobile augmented reality for an enclosed area. In example embodiments, controller device receives a fixed video stream from a fixed camera and a mobile video stream of a current field of view of a mobile user device. The mobile user device comprises a reality augmentation module to project information on the current field of view. Further, the controller device includes a tracking module to identify a position and orientation of a mobile user of the mobile user device based on image processing of the fixed video stream and a fuzzy map module to use a fuzzy map of the enclosed area and the position and orientation of the mobile user to identify items of interest in the current field of view of the mobile user
(Continued)

device, where the fuzzy map is generated based on a floor plan of the enclosed area.

18 Claims, 6 Drawing Sheets

(51) Int. Cl.
| | |
|---|---|
| *G06T 17/05* | (2011.01) |
| *G06T 19/00* | (2011.01) |
| *H04N 7/18* | (2006.01) |
| *G06F 3/0487* | (2013.01) |
| *G06F 3/0481* | (2013.01) |
| *G06F 3/01* | (2006.01) |

(52) U.S. Cl.
CPC .......... *G06F 3/04815* (2013.01); *G06T 17/05* (2013.01); *G06T 19/006* (2013.01); *H04N 7/18* (2013.01)

(56) References Cited

U.S. PATENT DOCUMENTS

| | | |
|---|---|---|
| 2011/0115816 A1 | 5/2011 | Brackney |
| 2011/0199479 A1 | 8/2011 | Waldman |
| 2011/0285811 A1 | 11/2011 | Langlotz |
| 2012/0069028 A1 | 3/2012 | Bouguerra |
| 2012/0075343 A1 | 3/2012 | Chen et al. |
| 2012/0242798 A1 | 9/2012 | Mcardle et al. |
| 2012/0249416 A1 | 10/2012 | Maciocci |
| 2012/0249588 A1 | 10/2012 | Tison et al. |
| 2013/0026220 A1 | 1/2013 | Whelihan |
| 2013/0121531 A1 | 5/2013 | Lefevre |
| 2014/0292642 A1 | 10/2014 | Schubert et al. |
| 2015/0161715 A1* | 6/2015 | Rose .................. G06Q 30/0639 705/26.8 |

FOREIGN PATENT DOCUMENTS

| | | |
|---|---|---|
| KR | 20130012629 | 2/2013 |
| TW | 201207742 | 2/2012 |
| TW | 201214298 | 4/2012 |
| WO | WO-2012047905 A2 | 4/2012 |
| WO | WO-2012171955 A2 | 12/2012 |

OTHER PUBLICATIONS

Xun Luo, "The Cloud-mobile Convergence Paradigm for Augmented Reality," Dec. 9, 2011, http://cdn.intechopen.com/pdfs/24824/InTech-The_cloud_mobile_convergence_paradigm_for_augmented_reality.pdf.

* cited by examiner

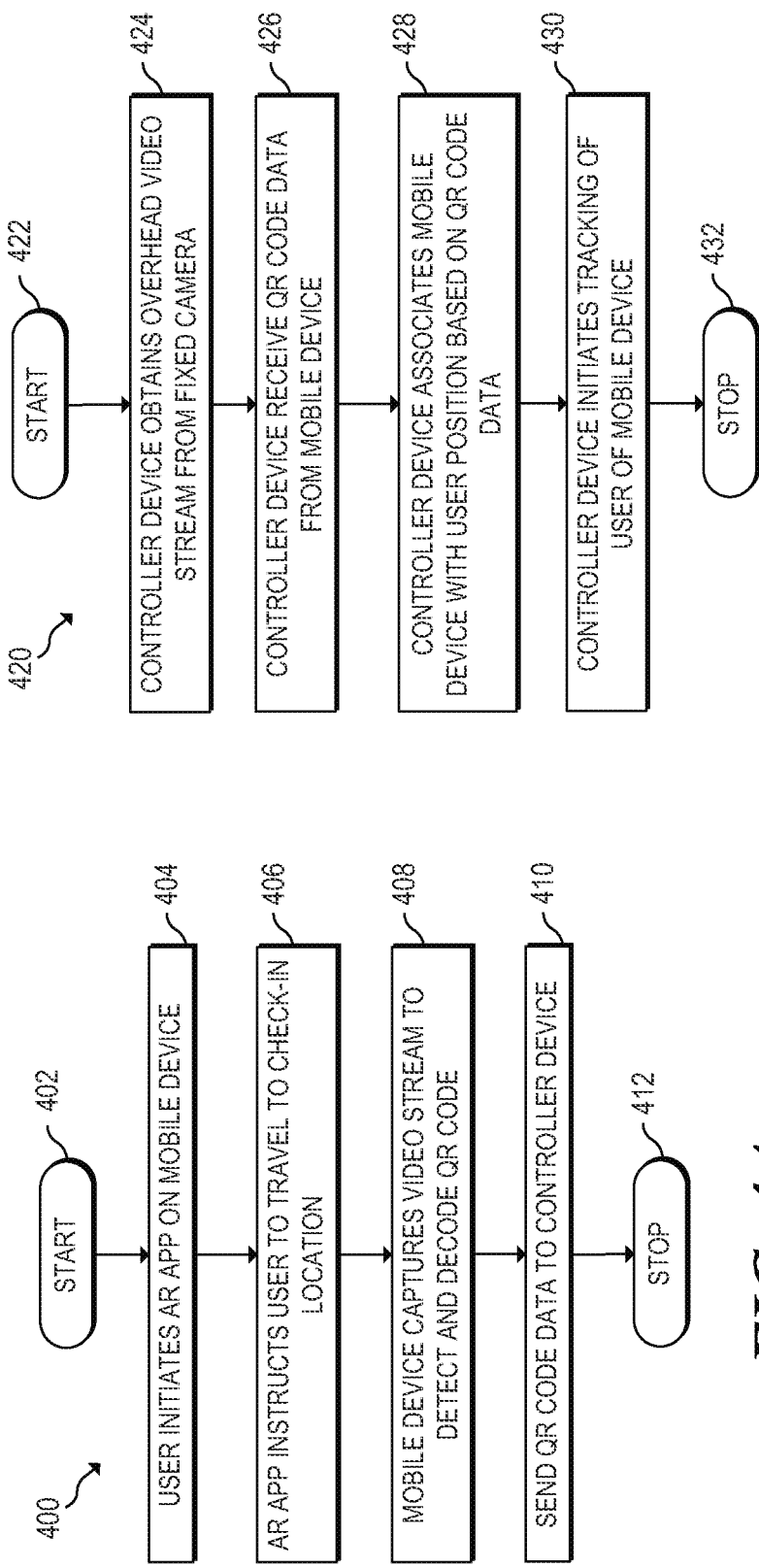

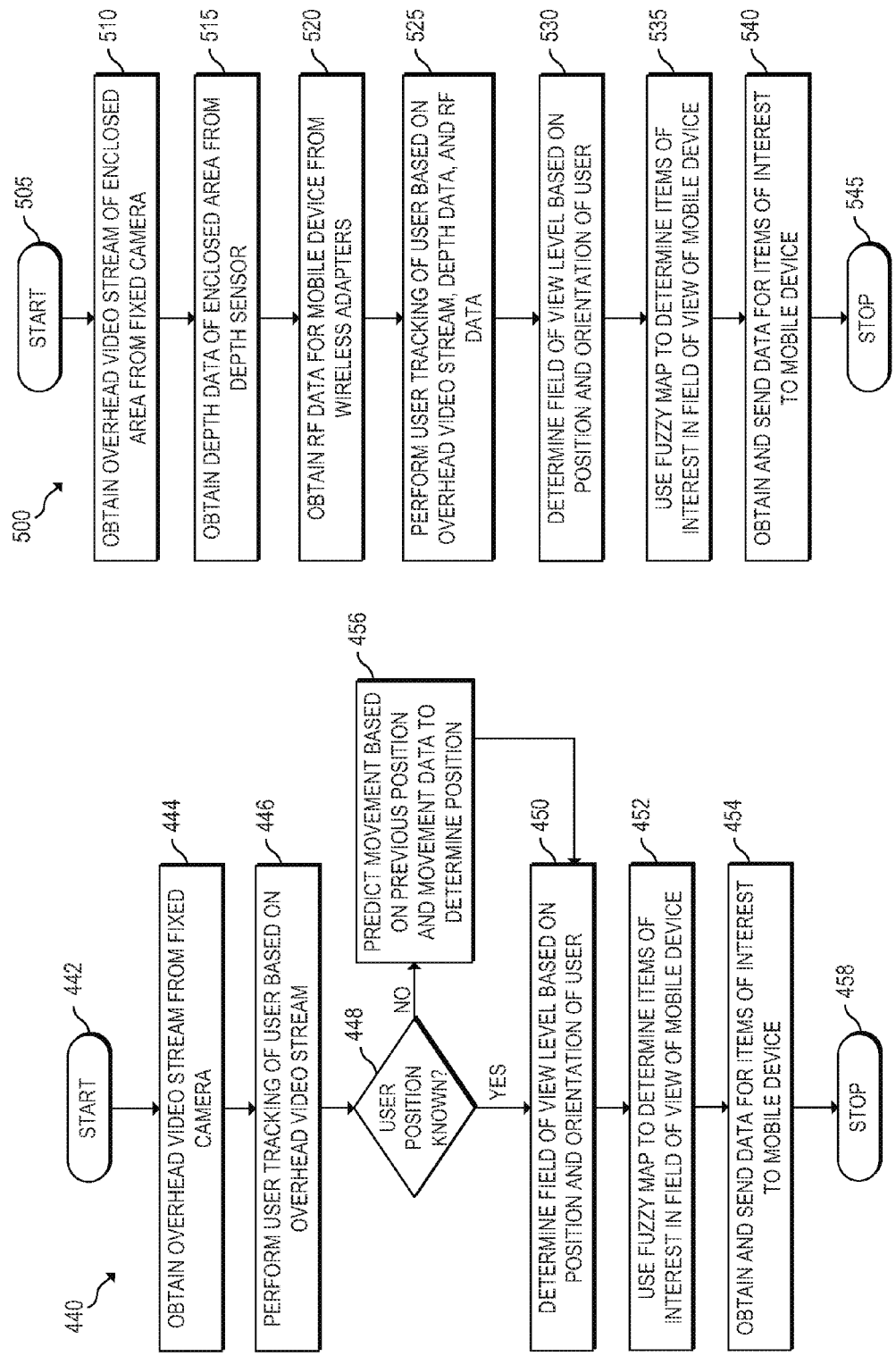

MOBILE AUGMENTED REALITY FOR MANAGING ENCLOSED AREAS

BACKGROUND

Consumer mobile devices, such as smartphones and tablets, are increasingly common in enterprise environments, a phenomenon known as IT consumerization. Such mobile devices are often capable of augmented reality (AR), which extends the interaction of a user with the real world by combining virtual and real elements. The use of mobile AR can enable new possibilities for easier and richer experiences in managing enclosed areas (e.g., warehouses, datacenters, shopping centers, etc.).

BRIEF DESCRIPTION OF THE DRAWINGS

The following detailed description references the drawings, wherein:

FIGS. 4A-4C are flowcharts of an example method for execution by an example system for providing mobile AR for managing enclosed areas that includes user tracking;

FIG. 5 is a flowchart of an example method for execution by an example system for providing mobile AR for managing enclosed areas that is enhanced with positioning and depth data;

DETAILED DESCRIPTION

As discussed above, mobile AR can be used to enhance mobile video streams of mobile devices with virtual information for managing enclosed areas such as datacenters. For example, quick response codes may be positioned so that items of interest in a mobile video stream can be identified and then overlaid with virtual information such as status information of equipment in a datacenter. The mobile AR typically uses (1) the global positioning system (GPS) to determine a position of a user of the mobile device in the enclosed area and (2) object recognition to identify the items of interest in the mobile video stream. However, GPS is typically not very accurate indoors even if the positioning is enhanced with information from wireless adapters.

Various approaches to determine the position of a user indoors have been attempted with diverse results. For example, an indoor positioning system (IPS) based on Wi-Fi triangulation may be used to determine the position of the user indoors. Because Wi-Fi networks are used, IPS may expose sensitive information about a wireless network that can be exploited by rogue clients. Further, IPS does not provide information regarding the mobile device's field of view.

Example embodiments disclosed herein provide a system for mobile augmented reality for managing enclosed areas. For example, in some embodiments, the system includes a controller device that receives a fixed video stream from a fixed camera in an enclosed area and a mobile video stream from a mobile user device. The controller device may determine a position and orientation of a mobile user of the mobile user device based on the fixed video stream. At this stage, the controller device may use a fuzzy map of the enclosed area and the position and orientation of the mobile user to identify items of interest in the current field of view of the mobile user device, where the fuzzy map is generated based on a floor plan of the enclosed area.

In this manner, example embodiments disclosed herein allow for the position and orientation of the mobile user to be more accurately determined by enhancing the determination with a fixed video stream of the enclosed area. Specifically, the fixed video stream allows for tracking of a user to be performed, which may then be used to determine a current field of view of the mobile user device. With the current field of view, items of interest in a mobile video stream may be identified and overlaid with virtually presented information.

Figure 1:
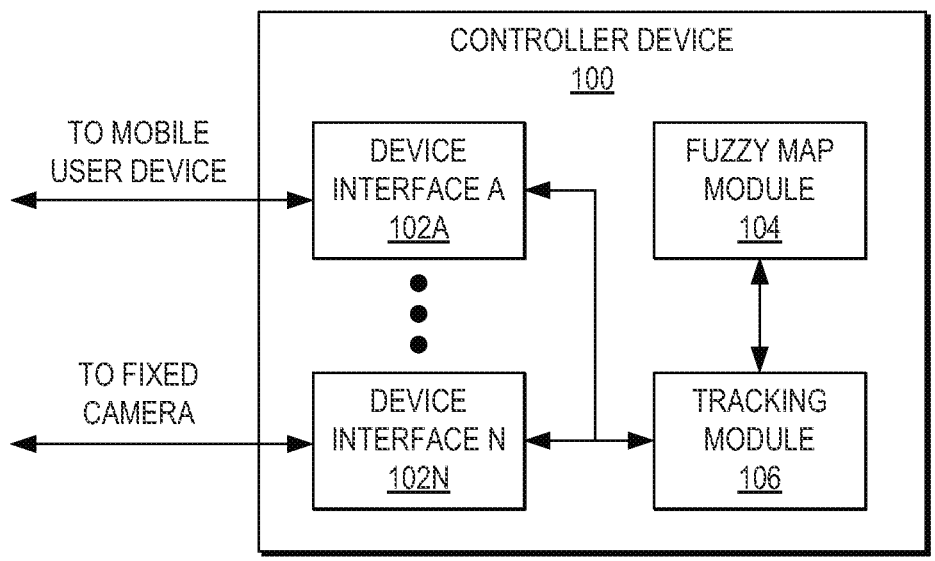
FIG. 1 is a block diagram of an example controller device for providing mobile AR for managing enclosed areas.

Referring now to the drawings, FIG. 1 is a block diagram of an example controller device 100 for providing mobile AR for managing enclosed areas. The example controller device 100 may be implemented in a computing device such as a server computer, notebook computer, a desktop computer, or any other electronic device suitable for providing mobile AR. In the embodiment of FIG. 1, controller device 100 includes device interfaces (e.g., device interface A 102A, device interface 102N, etc.), fuzzy map module 104, and tracking module 106.

Each device interface (e.g., device interface A 102A, device interface 102N, etc.) may be configured to interact with an external device that includes sensors such as cameras, motion sensors, radio frequency (RF) receivers, etc. Specifically, a device interface (e.g., device interface A 102A, device interface 102N, etc.) may receive a video stream and/or positioning data from a corresponding connected external device. Further, the device interface (e.g., device interface A 102A, device interface 102N, etc.) may also send information or commands to the external device. For example, if the external device is a fixed camera, device interface 102N may send commands to reposition the camera of the fixed camera. In another example, if the external device is a mobile user device, device interface 102A may send virtual overlays to the mobile user device to be used in mobile AR.

Each device interface (e.g., device interface A 102A, device interface 102N, etc.) may be an Ethernet interface, a Universal Serial Bus (USB) interface, an IEEE 1394 (FireWire) interface, an external Serial Advanced Technology Attachment (eSATA) interface, or any other physical connection interface suitable for communication with a client device. Alternatively, each device interface (e.g., device interface A 102A, device interface N 102N, etc.) may be a wireless interface, such as a wireless local area network (WLAN) interface or a near-field communication (NFC) interface.

Fuzzy map module 104 is configured to generate fuzzy maps based on a floor plan of an enclosed area. Specifically, fuzzy map module 104 may use predetermined floor plans of enclosed areas to generate fuzzy maps describing the location of items of interest in the enclosed areas. For example, the enclosed area may be partitioned into nested squares or cubes organized in a tree structure, where each square or cube in the tree is associated with items of interest existing in that portion of the enclosed area (i.e., a quadtree describing two-dimensional portions of the enclosed area or an octree describing three-dimensional portions of the enclosed area). The tree structure allows items of interest to be quickly identified by projecting the current field of view onto the cubes of the enclosed area. In some cases, fuzzy map module 104 may provide a user interface that allows an administrator to specify the position of items of interest within the fuzzy map.

Fuzzy map module 104 may also be configured to use a fuzzy map to identify items of interest in the current field of view of a mobile device. The field of view of a mobile device may be determined based on the position and orientation of a mobile user, which are identified as discussed below with respect to tracking module 106. For example, the dimensions of the enclosed area and location of items of interest in a fuzzy map may be used to create data for information overlays for a determined position and orientation of a mobile user of a mobile user device. In some cases, the items of interest are identified in the fuzzy map using fuzzy logic to provide approximate and, therefore, more inclusive results. For example, if the mobile user is positioned on the border of adjacent partitions of a fuzzy map, items of interests from both partitions may be identified as being in the current field of view.

Tracking module 106 may be configured to monitor the position and orientation of mobile users in the enclosed area. Specifically, tracking module 106 may be configured to use an overhead video stream received from a fixed camera to perform user tracking of any users in the enclosed area. For example, blob tracking may be used to track a user in the enclosed area, where blob tracking refers to image processing that includes the automatic detection of regions in a digital image or video stream that differ in properties such as brightness or color. A blob may be a region that is detected as having substantially consistent properties, where a user blob may be such a region that is determined to be a mobile user. The position and orientation of the mobile user may be used by fuzzy map module 104 to determine a current field of view of the mobile user device, which is then used to identify items of interest that should be included in overlay data for the mobile user device. Tracking module 106 may log the determined positions of the mobile device over time as movement data.

Tracking module 106 may also be configured to associate mobile devices with corresponding tracked users from the overhead video stream. For example, tracking module 106 may use positioning data from a mobile device to associate the mobile device with a user detected in the overhead video stream. In this example, the positioning data (e.g., GPS data, RF data, motion sensor data, QR code data, etc.) is used by tracking module 106 to determine a current position of the mobile device within the enclosed area, where the current position is then used to identify the nearest tracked user.

Overlay data provided by tracking module 106 to mobile user devices may include status information and recognition information for the items of interest in a current field of view of a mobile device. Recognition information may allow the mobile user device to recognize an item of interest in its mobile video stream. For example, recognition information may include the dimensions and other visual characteristics of an item of interest (e.g., the visual characteristics of a server in a datacenter). Recognizing an item of interest in the mobile video stream allows the mobile user device to overlay related status information over the item of interest in the mobile video stream. The overlaid information may be snapped to and track items of interest in the mobile video stream such that the overlaid information moves as the field of view of the mobile video stream changes.

Each of the modules described above may be implemented to be executed on a processor with one or more central processing units (CPUs), microprocessors, and/or other hardware devices suitable for retrieval and execution of instructions stored in a machine-readable storage medium. As an alternative or in addition to retrieving and executing instructions, the processor may include one or more electronic circuits comprising a number of electronic components for performing the functionality of one or more of the instructions.

The machine-readable storage medium may be any electronic, magnetic, optical, or other physical storage device that stores executable instructions. Thus, the machine-readable storage medium may be, for example, Random Access Memory (RAM), an Electrically-Erasable Programmable Read-Only Memory (EEPROM), a storage drive, an optical disc, and the like.

Figure 2:
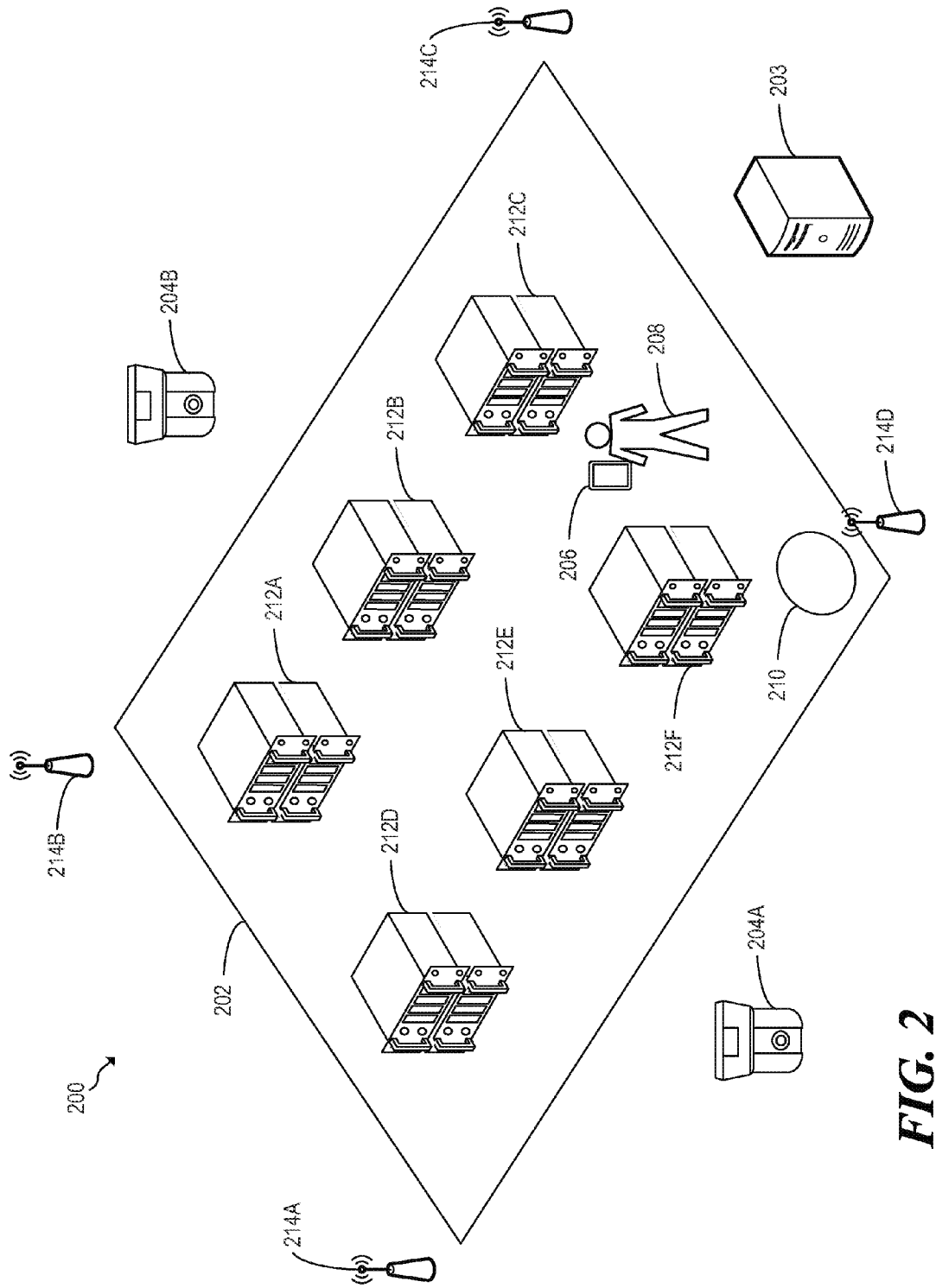
FIG. 2 is a block diagram of an example system for providing mobile AR for managing an enclosed area.

FIG. 2 is a block diagram of an example system 200 including a controller device 203 for providing mobile AR for managing an enclosed area 202. As with controller device 100 of FIG. 1, controller device 203 may be implemented on any electronic device suitable for providing mobile AR. The components of controller device 203 may be similar to the corresponding components of controller device 100 described with respect to FIG. 1.

Enclosed area 202 may be any enclosed, indoor area with a known floor plan. Examples of enclosed areas 202 include datacenters, shopping malls, warehouses, office buildings, etc. In this example, enclosed area 202 is a datacenter including a number of servers 212A, 212B, 212C, 212D, 212E, 212F. Each server (e.g., 212A, 212B, 212C, 212D, 212E, 212F) may be a modular server such as a rack server or a blade server or some other computing device dedicated to providing one or more services (e.g., database services, file services, mail services, print services, etc.). The position of servers 212A, 212B, 212C, 212D, 212E, 212F may be designated in a fuzzy map of the enclosed area 202, where the fuzzy map is a two-dimensional or three-dimensional representation of the enclosed area 202 that is generated based on the known floor plan. In other embodiments, other items of interest such as inventory, store fronts, offices, etc. may be included in the enclosed area. Controller device 203 may be configured to receive status information from servers 212A, 212B, 212C, 212D, 212E, 212F. For example, controller device 203 may receive server events (e.g., errors, configuration issues, warnings, etc.) and/or component status information (e.g., operating temperatures, hardware failures, etc.) from each of the servers 212A, 212B, 212C, 212D, 212E, 212F. In other cases, controller device 203 may be configured to obtain status information from a datacenter management interface (not shown) that is operatively connected to servers 212A, 212B, 212C, 212D, 212E, 212F. The datacenter management interface may be configured to manage status information from servers 212A, 212B, 212C, 212D, 212E, 212F and other equipment in enclosed area 202 for use by controller device 203.

Fixed cameras 204A, 204B are positioned over enclosed area 202 and are configured to capture overhead video streams of enclosed area 202. Fixed cameras 204A, 204B may also be configured to reposition the orientation of their image capture devices so that different portions of enclosed area 202 are included in the overhead video streams. In some cases, fixed cameras 204A, 204B may also include depth sensors that capture depth data, which is then associated with the overhead video streams. For example, the depth sensor may use an infrared (IR) projector to project an IR star-field with points of varying widths onto enclosed area 202, where an IR sensor may capture the IR star-field to determine depth data for objects in enclosed area 202. The depth data may be used to enhance user tracking performed by controller device 203. In this case, controller device 203 may combine the overhead video streams and depth data to identify the position and orientation of mobile users 208 in enclosed area 202. Enclosed area 202 may be configured with any number of fixed cameras (e.g., fixed cameras 204A, 204B) depending on the size and the layout of the enclosed area 202.

Mobile user 208 may be positioned in and moving about enclosed area 202. For example, mobile user 208 may be a system administrator of a datacenter. Mobile user 208 may have a mobile user device 206 such as a tablet or smartphone that is equipped with a camera device. Mobile user device 206 may include a reality augmentation module to provide mobile AR to mobile user 208 as he travels in enclosed space 202. For example, the reality augmentation module of mobile user device 206 may display a mobile video stream with overlaid status information for servers 212A, 212B, 212C, 212D, 212E, 212F as the mobile user 208 changes position within enclosed area 202. The overlaid status information may be generated by controller device 203 similar to as discussed above with respect to controller device 100 of FIG. 1. In this example, the mobile user device 206 may recognize servers 212A, 212B, 212C, 212D, 212E, 212F in the mobile video stream and overlay relevant information for each of the servers 212A, 212B, 212C, 212D, 212E, 212F based on their recognized positions.

In some cases, mobile user device 206 may be configured to perform object rejection to identify server equipment such as servers 212A, 212B, 212C, 212D, 212E, 212F in the mobile video stream of enclosed area 200. For example, mobile user device 206 may be preconfigured with object patterns (i.e., preconfigured with visual characteristics of items of interest) for servers 212A, 212B, 212C, 212D, 212E, 212F and their components (e.g., processing modules, storage modules, networking modules, etc.). In another example, the object patterns may be provided by the controller device 203. In either case, the reality augmentation module of mobile user device 206 may overlay the status information on the mobile video stream by snapping representations of the server equipment to the identified server equipment in the mobile video stream.

Servers 212A, 212B, 212C, 212D, 212E, 212F may be configured with remote management software that allows for devices such as mobile user device 206 to remotely administer servers 212A, 212B, 212C, 212D, 212E, 212F. In this case, mobile user device 206 may connect to the remote management software of a server in response to mobile user 208 selecting the server in the mobile video stream. For example, the mobile user 208 may select a server that has a detected error in the mobile video stream to access the remote management software and immediately address the detected error on the server.

Enclosed area 202 may include check-in location 210 for associating mobile user device 206 with a tracked mobile user 208. Check-in location 210 may include a nearby QR code that mobile user 208 is instructed to capture with mobile user device 206. The QR code allows controller device 203 to identify mobile user device 206 as providing a mobile video stream including the QR code and then associating mobile user device 206 with mobile user 208 as, for example, identified by blob tracking, which is performed based on the overhead video stream from fixed camera 204. After mobile user device 206 is associated with mobile user 208, controller device 203 may continue to track mobile user 208 and provide position-relevant mobile AR data to mobile user device 206 as mobile user 208 changes position within enclosed area 208. If controller device 203 begins to have difficulty in tracking mobile user 208, mobile user device 206 may instruct mobile user 208 to return to check-in location 210 so that tracking may be resumed.

In some cases, system 200 may also include wireless adapters 214A, 214B, 214C, 214D that are configured to obtain RF data from mobile user device 206. Examples of wireless adapters 214A, 214B, 214C, 214D include wireless routers, Bluetooth receivers, wireless adapters, etc. The RF data may include RF signal data (e.g., signal strength, receiver sensitivity, etc.) and may be used to enhance the positioning data obtained from mobile user device 206. For example, the RF data may be used to perform RF triangulation to more accurately determine the position of mobile user device 206. More specifically, the relative position of the mobile user device 206 with respect to each wireless adapter 214A, 214B, 214C, 214D may be used to triangulate the position of the mobile user device 206. Relative position may be a distance perimeter that the mobile user device 206 is within with respect to a wireless adapter, where the distance perimeter is calculated using the signal strength between the mobile user device 206 and the wireless adapter. In some cases, the wireless adapters 214A, 214B, 214C, 214D adapters are excluded from a local area network of servers 212A, 212B, 212C, 212D, 212E, 212F to enhance security. In this case, wireless adapters 214A, 214B, 214C, 214D may have a dedicated connection to controller device 203 that also restricts their access to the local area network of servers 212A, 212B, 212C, 212D, 212E, 212F.

Figures 3A, 3B:
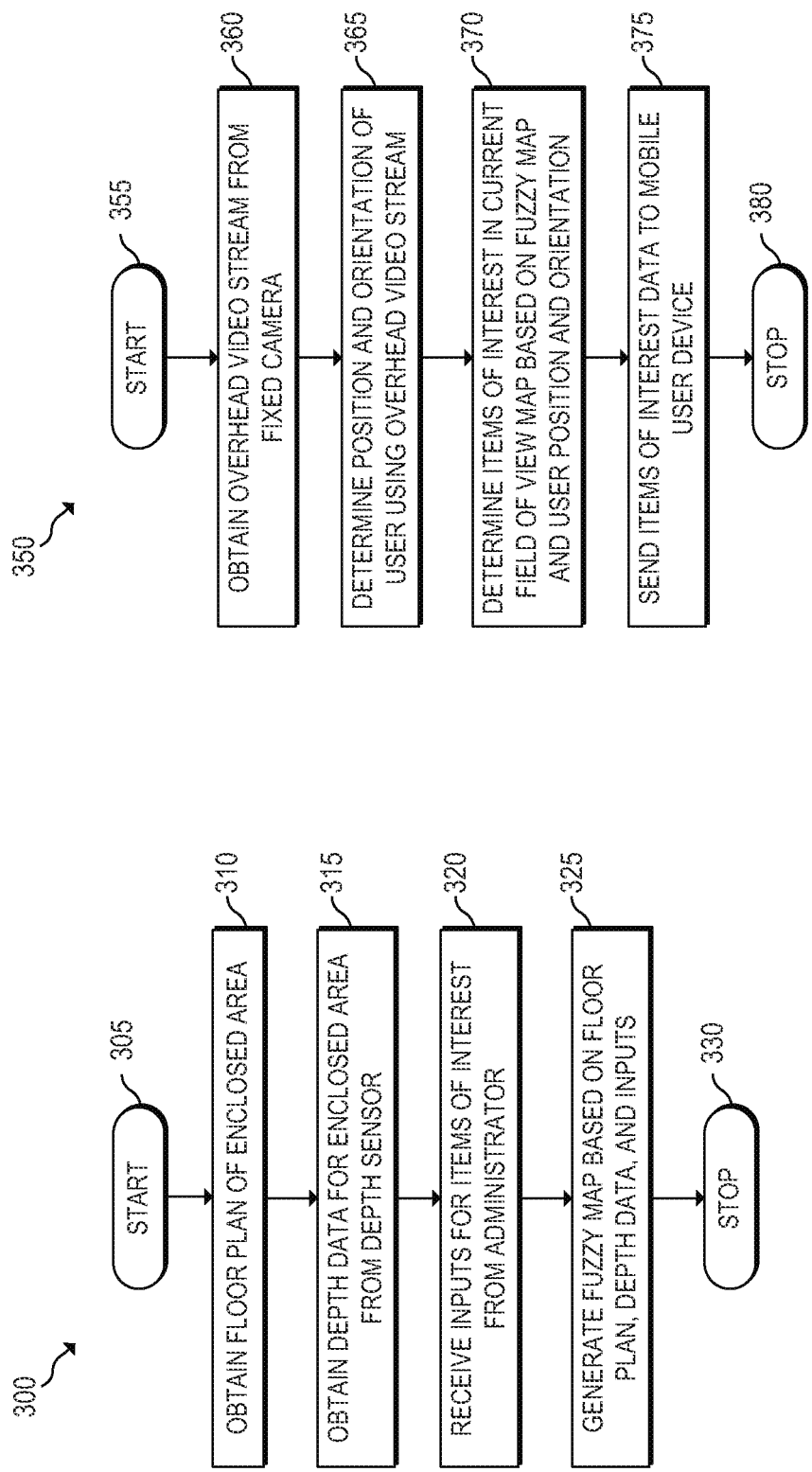
FIGS. 3A-3B are flowcharts of example methods for execution by a controller device for providing mobile AR for managing enclosed areas.

FIG. 3A is a flowchart of an example method 300 for execution by a controller device 100 for generating fuzzy maps for providing mobile AR. Although execution of method 300 is described below with reference to controller device 100 of FIG. 1, other suitable devices for execution of method 300 may be used, such as controller device 203 of FIG. 2. Method 300 may be implemented in the form of executable instructions stored on a machine-readable storage medium, such as computer readable medium 700 of FIG. 7, and/or in the form of electronic circuitry.

Method 300 may start in block 305 and continue to block 310, where controller device 100 obtains a floor plan of an enclosed area. For example, the floor plan may be a two-dimensional representation of the enclosed area that describes the dimensions of walls and items of interest in the enclosed area. Optionally, in block 315, depth data for the enclosed area is obtained from a depth sensor. The depth data may be used to enhance the floor plan obtained in block 305. Specifically, the depth data may be used if a three-dimensional representation of the enclosed area is generated in block 325.

In block 320, inputs for items of interest are received from an administrator of controller device 100. For example, the administrator may designate the position of items of interest within the floor plan. Next, in block 325, controller device 100 may generate a fuzzy map based on the floor plan, depth data, and inputs from the administrator. Specifically, the fuzzy map may be a three-dimensional representation of the enclosed area that is generated using the floor plan and the depth data, where the positions of some or all of the items of interest within the fuzzy map are specified based on the inputs from the administrator. In other cases, the fuzzy map may be a two-dimensional representation of the enclosed area that is generated using the floor plan, where the positions of some or all of the items of interest within the fuzzy map are specified based on the inputs from the administrator. Method 300 may subsequently proceed to block 330, where method 300 may stop.

FIG. 3B is a flowchart of an example method 350 for execution by a controller device 100 for providing mobile AR for managing enclosed areas. Although execution of method 350 is described below with reference to controller device 100 of FIG. 1, other suitable devices for execution of method 350 may be used, such as controller device 203 of FIG. 2. Method 350 may be implemented in the form of executable instructions stored on a machine-readable storage medium, such as computer readable medium 700 of FIG. 7, and/or in the form of electronic circuitry.

Method 350 may start in block 355 and continue to block 360, where controller device 100 may obtain an overhead video stream is obtained from a fixed camera of an enclosed area. The fixed camera may be installed on a ceiling of the enclosed area so that a portion of the enclosed area is captured in the overhead video stream. In block 365, the overhead video stream is used to determine a position and orientation of the mobile user. For example, blob tracking of the mobile user may be performed to detect the position and orientation of the mobile user.

Next, in block 370, items of interest are identified based on a fuzzy map and the mobile user's position and orientation. As discussed above, the fuzzy map may be a two-dimensional or three-dimensional mapping of items of interest in the enclosed area that is generated from a floor plan of the enclosed area. Once the items of interest are identified, data describing the items of interest may be provided to the mobile user device, which then uses the items of interest data to generate an augmented reality display of the mobile video stream in block 375. For example, the mobile user device may overlay status information for server equipment on the mobile video stream of a datacenter. Method 350 may subsequently proceed to block 380, where method 350 may stop.

FIGS. 4A-4C are flowcharts of an example methods 400, 420, 440 for execution by a controller device 203 for providing mobile AR for managing enclosed areas that includes user tracking. Although execution of methods 400, 420, 440 are described below with reference to controller device 203 and mobile user device 206 of FIG. 2, other suitable devices for execution of method 400 may be used, such as controller device 100 of FIG. 1. Methods 400, 420, 440 may be implemented in the form of executable instructions stored on a machine-readable storage medium, such as computer readable medium 700 of FIG. 7, and/or in the form of electronic circuitry.

In FIG. 4A, method 400 may start in block 402 and continue to block 404, where mobile user initiates an augmented reality (AR) application on his mobile user device 206. The AR application may display a mobile video stream of the enclosed area that is captured by an image capture device of mobile user device 206. In block 406, the AR application instructs to user to travel to a check-in location in the enclosed area. The check-in location may be designated with an informational poster.

Next, in block 408, mobile user device 206 detects and decodes a QR code in the mobile video stream. The QR code may include a unique identifier for initiating user tracking by controller device 203. In block 410, mobile user device 206 sends QR code data to controller device 203. Method 400 may subsequently proceed to block 412, where method 400 may stop.

In FIG. 4B, method 420 may start in block 422 and continue to block 424, where controller device 203 obtains an overhead video stream from a fixed camera of the enclosed area. The overhead video stream may be processed by controller device 203 to track users in the enclosed area. In block 426, controller device 203 receives QR code data from mobile user device 206. The QR code data notifies controller device 203 that mobile user device 206 is positioned at the check-in location.

In block 428, controller device 203 associates mobile user device 206 with a user being tracked at the check-in location. In this manner, user tracking for the mobile user device 206 may be initiated so that AR information as described below with respect to FIG. 4D may be provided to the mobile user device 206 in block 430. Method 420 may subsequently proceed to block 432, where method 420 may stop.

In FIG. 4C, method 440 may start in block 442 and continue to block 444, where controller device 203 may obtain an overhead video stream from a fixed camera of an enclosed area. In block 446, user tracking of a mobile user of the mobile user device 206 is performed using the overhead video stream. For example, regions in the overhead video stream with common characteristics may be analyzed to determine a position and orientation of the mobile user. The initial location of the user may be determined as described above with respect to FIG. 4B.

In block 448, it is determined if the current position of the mobile user is known (i.e., if the blob tracking successfully determined the current position of the mobile user). If the current position of the mobile user is not known, the current position may be determined based on the predicted movement of the mobile user, which is determined based on previous position and movement data of the mobile user in block 456. For example, if the mobile user is obscured by an item of interest in the enclosed area, the mobile user's current position may be determined based on the projected trajectory from his last known movement.

In block 450, a field of view level is determined based on the determined position and orientation of the mobile user. Examples of field of view levels include a server level for high-level status information and a component level for detailed status information. Next, in block 452, items of interest in a current field of view of the mobile user device 206 may be identified. The current field of view may be determined based on the current position and orientation of the mobile user. The current field of view may then be projected onto a map of the enclosed area so that items of interest that are in the field of view can be identified. In some cases, the items of interest may be pre-mapped into a two-dimensional or three-dimensional fuzzy map of the enclosed area based on the floor plan. For example, the enclosed area may be partitioned into nested cubes organized in a tree structure, where each cube in the tree is associated with items of interest existing in that portion of the enclosed area. The tree structure allows items of interest to be quickly identified by projecting the current field of view onto the cubes of the enclosed area. Further, the field of view level determined in block 450 may be used to perform an initial filtering of potential items of interest in the field of view (e.g., excludes component-level items of interest if the field of view level is the server level).

In block 454, data related to the items of interest in the current field of view is obtained and sent to the mobile user device 206. For example, status and recognition information related to the items of interest may be obtained datacenter management interface that is configured to obtain the status information from the items of interest (e.g., servers, wireless adapters, network hubs, etc.). In this example, the status and recognition information may be sent to the mobile user device 206, which then uses the recognition information to recognize the items of interest in the mobile video stream and overlays the status information. Method 440 may subsequently proceed to block 458, where method 440 may stop.

FIG. 5 is a flowchart of an example method 500 for execution by a controller device 203 for providing mobile AR for managing enclosed areas that is enhanced with positioning and depth data. Although execution of method 500 is described below with reference to controller device 203 of FIG. 2, other suitable devices for execution of method 500 may be used, such as controller device 100 of FIG. 1. Method 500 may be implemented in the form of executable instructions stored on a machine-readable storage medium, such as computer readable medium 700 of FIG. 7, and/or in the form of electronic circuitry.

Method 500 may start in block 505 and continue to block 510, where controller device 203 may obtain an overhead video stream from a fixed camera of an enclosed area. In block 515, depth data of the enclosed area is obtained from a depth sensor. In some cases, the depth sensor may be operatively connected to the fixed camera such that the overhead video stream is associated with and enhanced by the depth data.

In block 520, RF data for the mobile user device 206 is obtained from wireless adapters positioned throughout the enclosed area. The RF data may be used to triangulate the position of the mobile user device 206 in the enclosed area, thereby enhancing the positioning of the mobile user device 206 that is performed using the positioning data. In block 525, user tracking of a mobile user of the mobile user device 206 is performed using the overhead video stream, the depth data, and the RF data. For example, blob tracking may be performed to analyze regions in the overhead video stream with common characteristics, which includes distance away from the fixed camera as determined using the depth data, in order to determine a position and orientation of the mobile user. In this example, the overhead video stream, the depth data, and the RF data may be used to determine the current position and orientation of the mobile user and, thus, the mobile user device 206 in the enclosed area.

In block 530, a field of view level is determined based on the determined position and orientation of the mobile user. In block 535, items of interest in a current field of view of the mobile user device 206 may be identified.

In block 540, data related to the items of interest in the current field of view is obtained and sent to the mobile user device 206. For example, status and recognition information related to the items of interest may be obtained from a datacenter management interface and sent to the mobile user device 206, which then recognizes the items of interest in the mobile video stream and overlays the status information. Method 500 may subsequently proceed to block 545, where method 500 may stop.

Figure 6A:
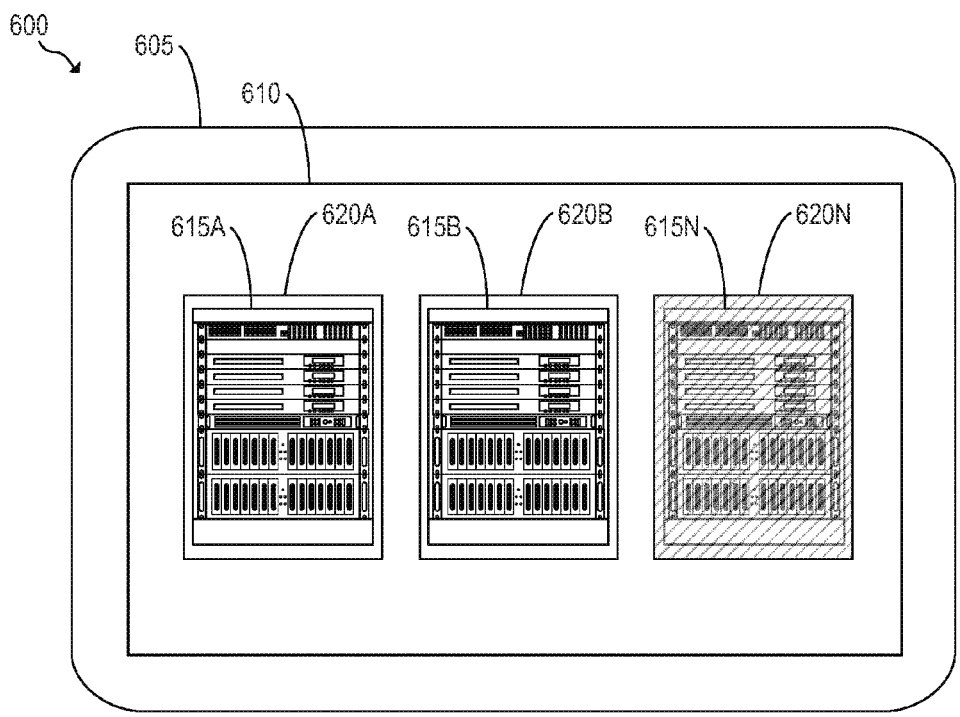
FIGS. 6A-6B are block diagrams of an example user interface for providing mobile AR for managing enclosed areas.
Figure 6B:
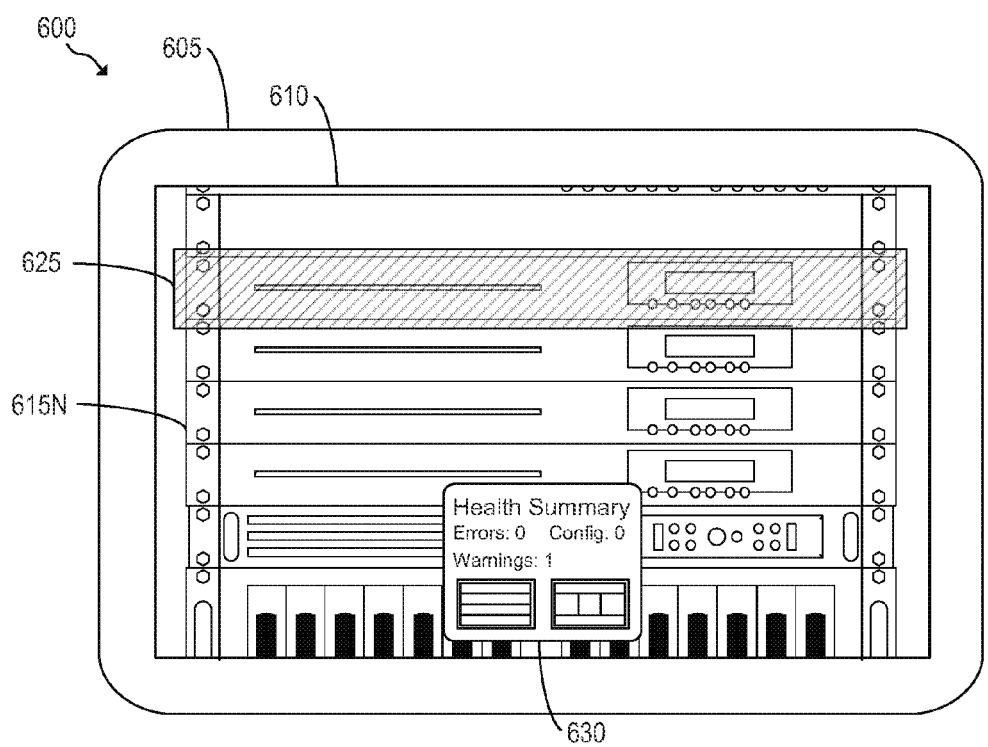

FIGS. 6A-6B are block diagrams of an example mobile user device 600 for providing mobile AR for managing enclosed areas. As depicted, the mobile user device 600 includes a body 605 with an embedded display screen 610. The display screen 610 shows a mobile video stream of a camera (not shown) in real-time. In FIG. 6A, the display screen 610 shows a portion of a datacenter that includes servers 615A, 615B, 615N. The display screen 610 also shows overlaid status information that is represented as status boxes 620A, 620B, 620N that are overlaid on their respective servers 615A, 615B, 615N. Status box 620A and status box 620B are clear to show that server 615A and server 615B have no detected issues. Status box 620N is cross-hatched to show that there is a detected issue with server 615N. As the user repositioning mobile user device 600, the status boxes 620A, 620B, 620N stay snapped to their respective servers 615A, 615B, 615N. The overlaid information allows a mobile user of the mobile user device 600 to quickly identify server 615N for maintenance to address the detected issue.

In FIG. 6B, a closer view of server 615N is shown on display screen 610. In this example, the mobile user has changed his position to be directly in front of server 615N in the datacenter. The specific portion of server 615N that is associated with the detected issue is highlighted by status box 625. Status box 625 allows the user to quickly identify the component of server 615N that may be causing the detected issue. Display screen 610 also shows a health summary 630 of server 615N. The health summary 630 includes notifications for various server events (e.g., errors, configuration issues, warnings) and health diagram overviews that show high-level status information for server 615N.

The type of overlaid information provided on display screen 610 may be determined by the mobile user's distance from servers 615A, 615B, 615N. For example, if multiple servers 615A, 615B, 615N are visible on the display screen, high-level information may be overlaid on the mobile video stream in the display screen 610 as shown in FIG. 6A. In another example, if the mobile user is close to a single server 615N, component-level information may be overlaid on the mobile video stream in the display screen 610 as shown in FIG. 6B. As the mobile user's view begins to focus in on particular components of server 615N, more detailed device information related to those particular components may be overlaid on the mobile video stream in display screen 610.

In some cases, an instructional video showing how to address the detected issue may also be shown on the display screen 610. The instructional video may be overlaid on the mobile video stream to direct the mobile user in interacting with server 615N. For example, the overlaid instructions may show how to dismount the portion of server 615N by highlighting and demonstrating the removal of fasteners. Alternatively, the instruction video may be displayed in a separate portion (e.g., window) of display screen 610. In another example, the display screen 610 may also be used to view the internal components of server 615N while server 615N remains assembled (i.e., overlaid information may provide a virtual x-ray showing the internal components of server 615N).

Figure 7:
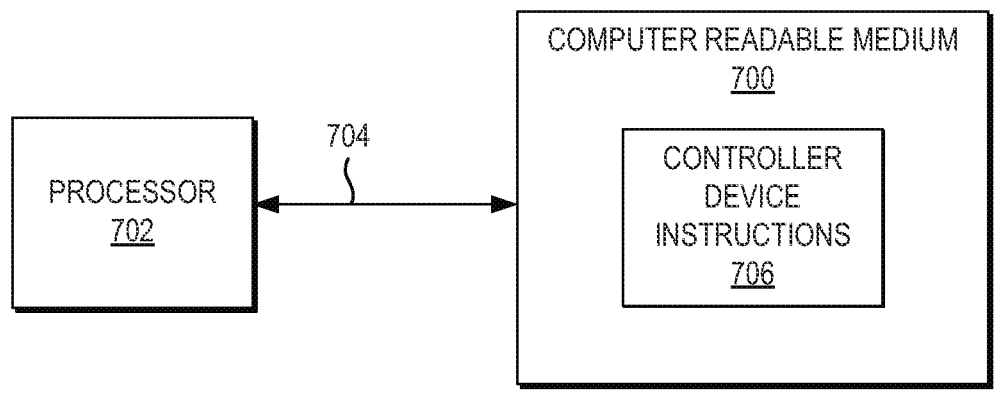
FIG. 7 is a block diagram showing an example non-transitory, computer-readable medium that stores instructions for providing mobile AR for managing enclosed areas.

FIG. 7 is an example block diagram showing a non-transitory, computer-readable medium that stores code for operating a storage device to provide mobile AR for managing enclosed areas. The non-transitory, computer-readable medium is generally referred to by the reference number 700 and may be included in controller device described in relation to FIG. 1. The non-transitory, computer-readable medium 700 may correspond to any typical storage device that stores computer-implemented instructions, such as programming code or the like. For example, the non-transitory, computer-readable medium 700 may include one or more of a non-volatile memory, a volatile memory, and/or one or more storage devices. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, solid state drives and flash memory devices.

A processor 702 generally retrieves and executes the instructions stored in the non-transitory, computer-readable medium 700 to operate the storage device in accordance with an example. In an example, the tangible, machine-readable medium 700 can be accessed by the processor 702 over a bus 704. A first region 706 of the non-transitory, computer-readable medium 700 may include functionality to implement controller device as described herein.

Although shown as contiguous blocks, the software components can be stored in any order or configuration. For example, if the non-transitory, computer-readable medium 700 is a hard drive, the software components can be stored in non-contiguous, or even overlapping, sectors.

The foregoing disclosure describes a number of example embodiments for providing mobile AR for managing enclosed areas. In this manner, the embodiments disclosed herein enhance mobile user tracking by using an overhead video stream to more accurately position mobile users in the enclosed area.

We claim:

1. A system for mobile augmented reality for managing enclosed areas, comprising:
   a fixed camera to obtain a fixed video stream of an enclosed area; and
   a controller device comprising:
      a device interface to receive the fixed video stream from the fixed camera;
      a mobile device interface to receive a mobile video stream of a current field of view of a mobile user device, wherein the mobile user device comprises a reality augmentation module to project information on the current field of view;
      a tracker running on at least one processor of the controller device to determine a position and orientation of a mobile user of the mobile user device based on image processing of the fixed video stream and based on a distance perimeter calculated using signal strength between the mobile user device and a wireless adapter, wherein the tracker is further to provide user instruction to return to a check-in location when the tracker experiences tracking difficulty; and
      a fuzzy mapper running on at least one processor of the controller device to use a fuzzy map of the enclosed area and the position and orientation of the mobile user to identify items of interest in the current field of view of the mobile user device, wherein the fuzzy map is generated based on a floor plan of the enclosed area.

2. The system of claim 1, wherein:
   the tracker is further to:
      track a movement of the mobile user device as movement data; and
      determine a predicted movement of the mobile user device based on the movement data; and
   the fuzzy mapper is further to update the items of interest in the current field of view based on the predicted movement of the mobile user device.

3. The system of claim 1, further comprising:
   a depth sensor to obtain depth data of the enclosed area, wherein the identification of the position and orientation of the mobile user is enhanced using the depth data.

4. The system of claim 1, wherein the tracker is further to:
   detect the mobile user at the check-in location, wherein the check-in location is in the enclosed area, and wherein the check-in location is a designated location for initiating the mobile augmented reality in the enclosed area; and
   associate the mobile user device with the mobile user based on a predetermined QR code that is provided by the mobile user device.

5. The system of claim 1, wherein the tracker identifies the position and orientation of the mobile user by performing blob tracking of the mobile user in the fixed video stream, and wherein the tracker is further to:
   determine a device position of the mobile user device based on positioning data received from the mobile user device; and
   associate the mobile user device with the mobile user based on the device position of the mobile user device and the position and orientation of the mobile user.

6. The system of claim 5, further comprising:
   a plurality of wireless adapters, including the wireless adapter, wherein each of the plurality of wireless adapters is used to transmit a radio frequency (RF) signal to the mobile user device for determining a relative position of the mobile user device, wherein the relative position of each of the plurality of wireless adapters is used to determine the device position of the mobile user device.

7. The system of claim 1, wherein the enclosed area is a datacenter and the fuzzy map further comprises status information for server equipment in the datacenter.

8. The system of claim 1, wherein a field of view level is determined based on the determined position and orientation of the mobile user.

9. The system of claim 8, further wherein the field of view level displays high level status information about a server based on the determined position and orientation of the mobile user.

10. The system of claim 8, further wherein the field of view level displays component level information about a server based on the determined position and orientation of the mobile user.

11. A method for mobile augmented reality for managing enclosed areas, comprising:
   obtaining a fixed video stream of a datacenter from a fixed camera;
   obtaining a mobile video stream of a current field of view of a mobile user device from the mobile user device, wherein the mobile user device comprises a reality augmentation module to project information on the current field of view;
   determining a position and orientation of a mobile user of the mobile user device based on image processing of the fixed video stream and based on distance perimeter calculated using signal strength between the mobile user device and a wireless adapter, wherein user instruction to return to a check-in location is provided when tracking difficulty is experienced; and
   using a fuzzy map of the datacenter and the position and orientation of the mobile user to identify server equipment in the current field of view of the mobile user device, wherein the fuzzy map is generated based on a floor plan of the datacenter.

12. The method of claim 11, further comprising:
   tracking a movement of the mobile user device as movement data;
   determining a predicted movement of the mobile user device based on the movement data; and updating the server equipment in the current field of view based on the predicted movement of the mobile user device.

13. The method of claim 11, further comprising:
   detecting the mobile user at the check-in location, wherein the check-in location is in the datacenter, and wherein the check-in location is a designated location for initiating the mobile augmented reality in the datacenter; and
   associating the mobile user device with the mobile user based on a predetermined QR code that is provided by the mobile user device.

14. The method of claim 11, further comprising:
   determining a device position of the mobile user device based on positioning data received from the mobile user device; and
   associating the mobile user device with the mobile user based on the device position of the mobile user device and the position and orientation of the mobile user.

15. A non-transitory machine-readable storage medium encoded with instructions executable by a processor, the machine-readable storage medium comprising:
   instructions to obtain a fixed video stream of a datacenter from a fixed camera;
   instructions to obtain a mobile video stream of a current field of view of a mobile user device from the mobile user device, wherein the mobile user device comprises a reality augmentation module to project information on the current field of view;
   instructions to determine a position and orientation of a mobile user of the mobile user device based on image processing of the fixed video stream and based on distance perimeter calculated using signal strength between the mobile user device and a wireless adapter, wherein user instruction to return to a check-in location is provided when tracking difficulty is experienced; and
   instructions to use a fuzzy map of the datacenter and the position and orientation of the mobile user to identify server equipment in the current field of view of the mobile user device, wherein the fuzzy map is generated based on a floor plan of the datacenter.

16. The storage medium of claim 15, further comprising instructions to:
   track a movement of the mobile user device as movement data;
   determine a predicted movement of the mobile user device based on the movement data; and
   update the server equipment in the current field of view based on the predicted movement of the mobile user device.

17. The storage medium of claim 15, further comprising instructions to:
   detect the mobile user at the check-in location, wherein the check-in location is in the datacenter, and wherein the check-in location is a designated location for initiating the mobile augmented reality in the datacenter; and
   associate the mobile user device with the mobile user based on a predetermined QR code that is provided by the mobile user device.

18. The storage medium of claim 15, further comprising instructions to:
   determine a device position of the mobile user device based on positioning data received from the mobile user device; and
   associate the mobile user device with the mobile user based on the device position of the mobile user device and the position and orientation of the mobile user.

\* \* \* \* \*